(No Model.)  
2 Sheets—Sheet 1.

A. STACKPOLE, Jr.
STREET SWEEPING MACHINE.

No. 287,186.  
Patented Oct. 23, 1883.

Witnesses.  
E. Planta.  
H. Galvin.

Inventor.  
Aaron Stackpole Jr.  
by J. H. Adams  
Atty.

(No Model.) 2 Sheets—Sheet 2.
A. STACKPOLE, Jr.
STREET SWEEPING MACHINE.
No. 287,186. Patented Oct. 23, 1883.
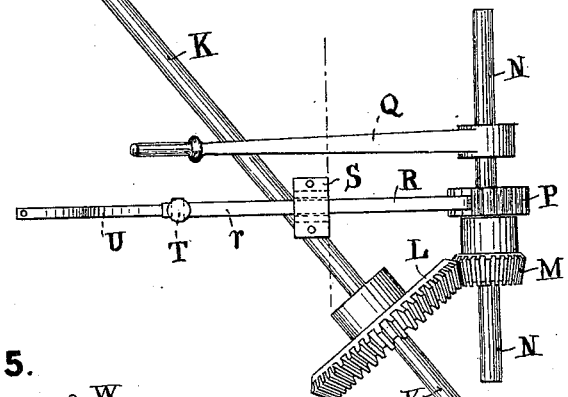
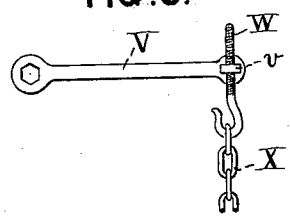
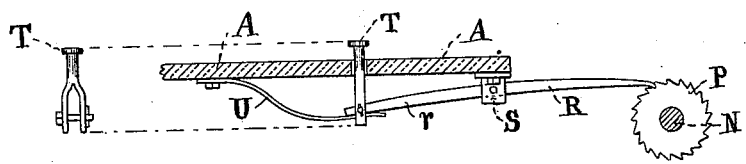
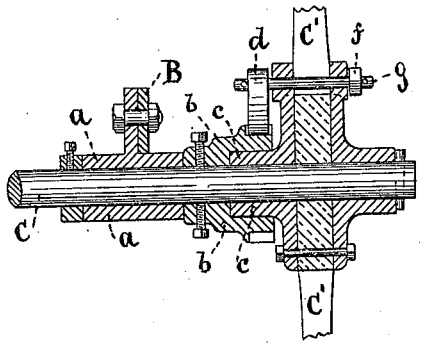
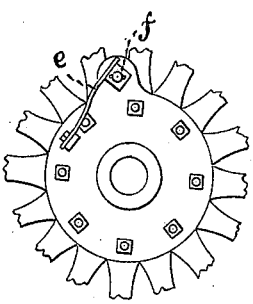
Witnesses.
E. Planta
H. Galvin
Inventor.
Aaron Stackpole Jr.
by J. H. Adams
Atty.

UNITED STATES PATENT OFFICE.

AARON STACKPOLE, JR., OF BOSTON, MASSACHUSETTS.

STREET-SWEEPING MACHINE.

SPECIFICATION forming part of Letters Patent No. 287,186, dated October 23, 1883.

Application filed August 5, 1882. (No model.)

*To all whom it may concern:*

Be it known that I, AARON STACKPOLE, Jr., of Boston, in the county of Suffolk and State of Massachusetts, have invented a new and useful Improvement in Street-Sweeping Machines, of which the following is a specification.

My invention relates to a means for raising and lowering the rotating brush, and also for adjusting the same so as to touch the ground evenly.

Figure 1:
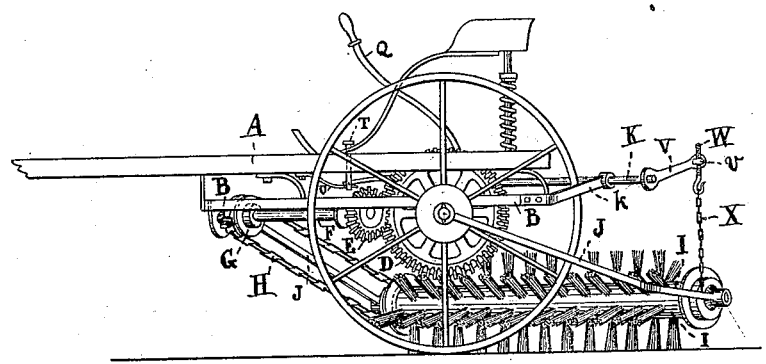
Figure 2:
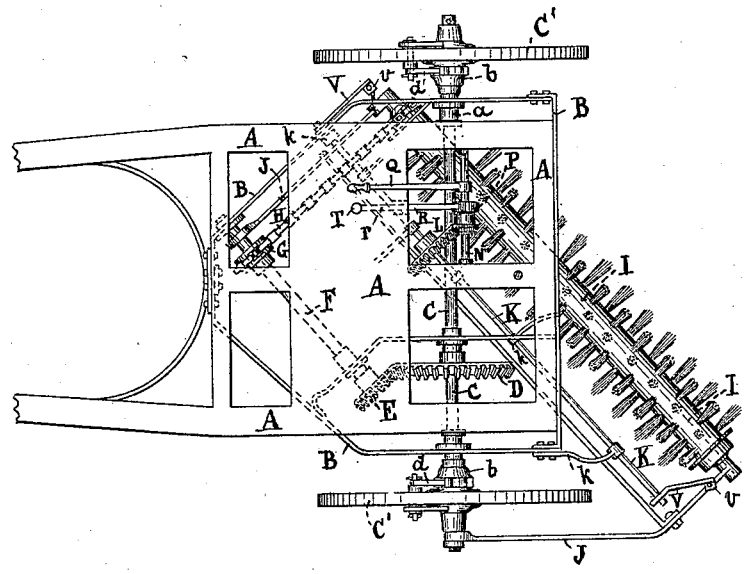

Referring to the accompanying drawings, Figure 1 represents a side view of a street-sweeping machine embodying my improvements. Fig. 2 is a plan or top view of the same. Figs. 3 to 8 are enlarged detail views of the several portions of my improvements.

A is the main frame, which is supported upon an auxiliary light iron frame, B, supported upon the axle or shaft C. Upon the axle C is fixed a bevel-wheel, D, which gears with a smaller bevel-wheel, E, on a counter-shaft, F, which latter carries on its opposite end a sprocket-wheel, G. Over this sprocket-wheel G passes an endless chain, H, which also passes over a sprocket-wheel attached to the end of the brush-roller I. The brush-roller I is carried by arms J J, which are loosely connected one to the axle C and the other to the counter-shaft F.

K is a rock-shaft, (shown in Figs. 2 and 3,) upon which is fixed a bevel-wheel, L, that gears with the bevel-wheel M on the counter-shaft N, which latter is supported in bearings from the frame A. On the counter-shaft N is fixed a ratchet-wheel, P, and also a hand-lever, Q.

R is a pawl pivoted in bearings S, attached to the under side of frame A. (See Figs. 3 and 4.) The extension $r$ of pawl R is secured to the lower end of a forked stem, T, which has a button on its upper end, and is held in its normal position by means of a spring, U, attached to the under side of frame A. The rock-shaft K is supported in bearings $k$ $k$, attached to the frame B. When the brush I is in contact with the ground and it is required to be raised, the driver presses down the stem T with his foot, which releases the pawl R from the ratchet-wheel P, leaving the shaft N free to turn. The driver then draws back the lever Q, causing the bevel-gear M to turn the bevel-gear L, and with it the shaft K, on the ends of which latter are the arms V, holding chains X, which support the rotating brush I.

To the ends of the arms V are swiveled nuts $v$, through which pass the screw-threaded rods W, having hooks on their lower ends. Upon these hooks are hung the chains X, the lower ends of the chains being connected to the arms J, so that should the brush not be exactly level or in proper relation to the surface of the ground the rod W can be adjusted higher or lower on either side, so as to bring the brush into proper position.

The shaft or axle C of the driving-wheels C' is supported in bearings $a$, secured to the frame B, (see Fig. 6,) and on the axle C is secured a box, $b$, into which passes an elongation of the hub $c$, so that any dirt or dust that may be thrown up by the brush is prevented from working between the inside of the hub and the axle. The box $b$, called the "sand-box," is provided on its outer periphery with ratchet-teeth, (shown in dotted lines in Fig. 8, which is an inside view of the hub, Fig. 7 being an outside view,) with which teeth the pawl $d$ engages, so that when the wheels rotate in a forward direction the pawl $d$ will cause the axle C to revolve; but when the machine moves backward the pawl $d$ will ride over the ratchet-teeth and prevent the axle from rotating. The pawl $d$ is held in position by a spring, $e$, on the opposite side of the wheel, and which bears upon a square-headed nut, $f$, on the spindle $g$, which carries the pawl $d$. When the brush is not to be rotated, the pawls $d$ are thrown out of gear with the ratchets on the sand-boxes.

I am aware that it is not new to apply a pawl to the wheel for the same purpose as shown in my machine, and also that it is common to elongate the hub and place on it a box, and to these I make no claim; but

What I claim as my invention is—

1. The combination of the auxiliary frame B, rock-shaft K, shaft N, and the intermediate gears, L M, arms V, the lever Q, and the pawl and ratchet R P, all arranged and operating substantially as and for the purpose set forth.

2. In a street-sweeping machine, in combination, the axle C, the bearing $a$, elongated hub $c$, box $b$, attached to the axle by set-screws, and provided with ratchet-teeth, pawl $d$, and spring $e$, and the spindle $g$, all arranged as shown, and for the purpose described.

In testimony whereof I have signed my name to this specification in the presence of two subscribing witnesses.

AARON STACKPOLE, JR.

Witnesses:
JOS. H. ADAMS,
E. PLANTA.